United States Patent [19]

Takeda et al.

[11] Patent Number: 4,612,418
[45] Date of Patent: Sep. 16, 1986

[54] METHOD FOR CONTROLLING TASK PROCESS AND DEVICE THEREOF

[75] Inventors: Yoshiaki Takeda, Kanagawa; Takashi Oyamada; Toshiaki Hayasaka, both of Tokyo; Osamu Kai, Kanagawa; Toshimichi Kubota, Saitama, all of Japan

[73] Assignee: Tamura Electric Works, Ltd., Japan

[21] Appl. No.: 617,462

[22] Filed: Jun. 5, 1984

[30] Foreign Application Priority Data

Jun. 14, 1983 [JP] Japan .................................. 58-106221

[51] Int. Cl.⁴ .......................................... H04M 17/02
[52] U.S. Cl. .................................. 179/81 R; 364/706; 364/707; 179/6.3 R
[58] Field of Search ............... 179/81 R, 27 G, 6.3 R, 179/6.31, 2 BC; 364/707, 706, 736

[56] References Cited

U.S. PATENT DOCUMENTS 3,449,524  6/1969  Pharis .................. 179/6.3 R
4,039,768  8/1977  O'Maley .................. 179/175.2 C

FOREIGN PATENT DOCUMENTS 0012102  6/1980  European Pat. Off. .

OTHER PUBLICATIONS

Radio Shack Catalog, 1982, p. 154.

Primary Examiner—James L. Dwyer
Attorney, Agent, or Firm—Remy J. VanOphem

[57] ABSTRACT

A method for controlling task processes using a minimum of energy. The task processes are divided into two or more groups in accordance with an execution priority. The individual task processes within each group are further prioritized with respect to each other. The method is driven by repetitive processing cycles. During each processing cycle, the highest priority task of the highest priority group is selected and executed. The method assumes a sleep or low power drain state in response to the completion of the execution of a selected task process or when no task process is available for processing and is returned to an operational state in response to the next processing cycle. The task process of the lower priority groups are selected at a longer execution cycle rate which are an integer multiple of the processing cycles.

19 Claims, 16 Drawing Figures

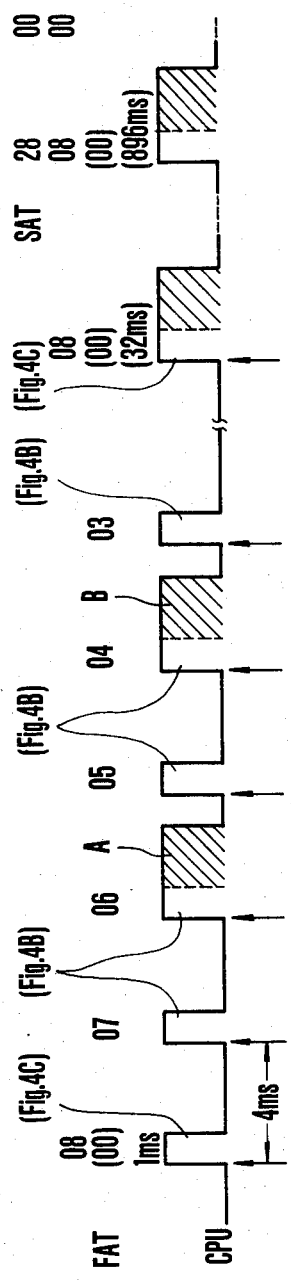
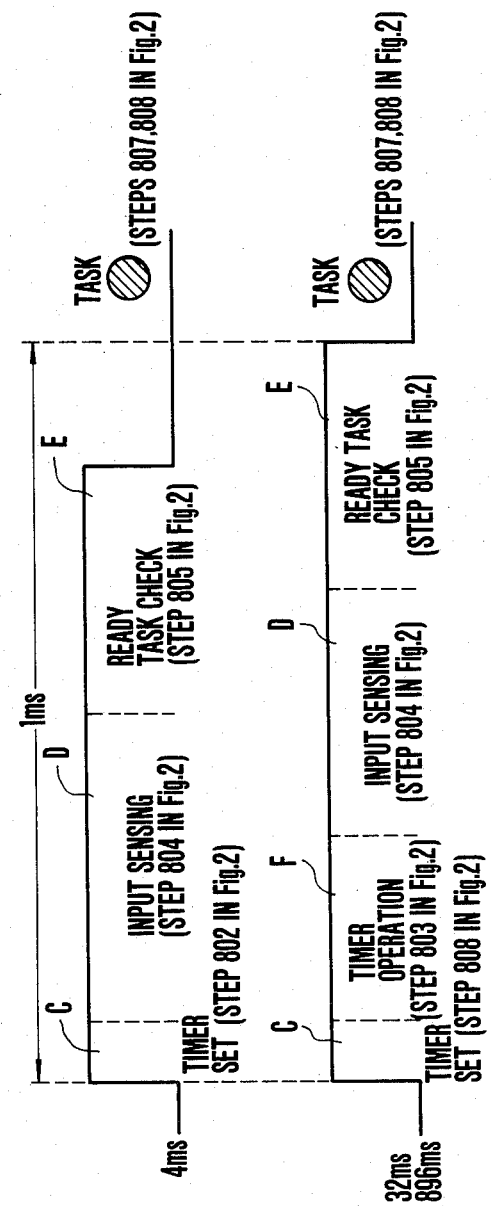
FIG. 4A
FIG. 4B
FIG. 4C

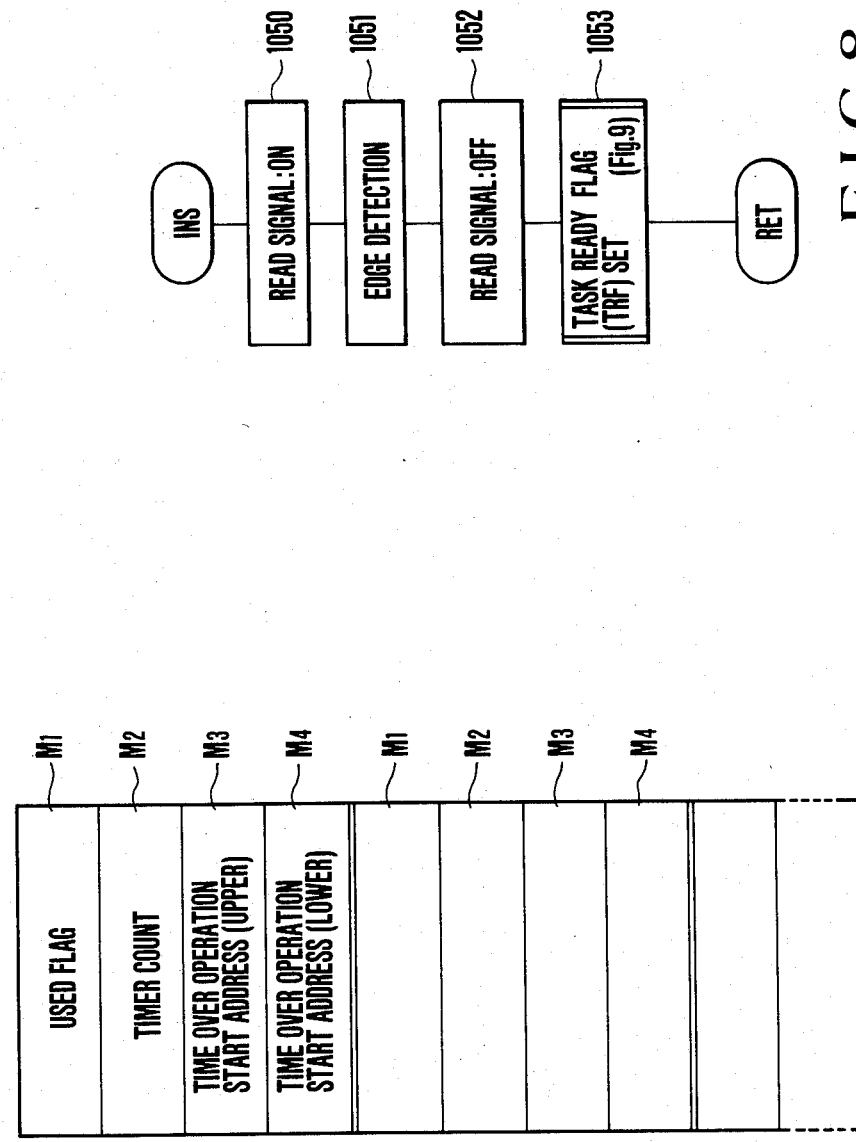

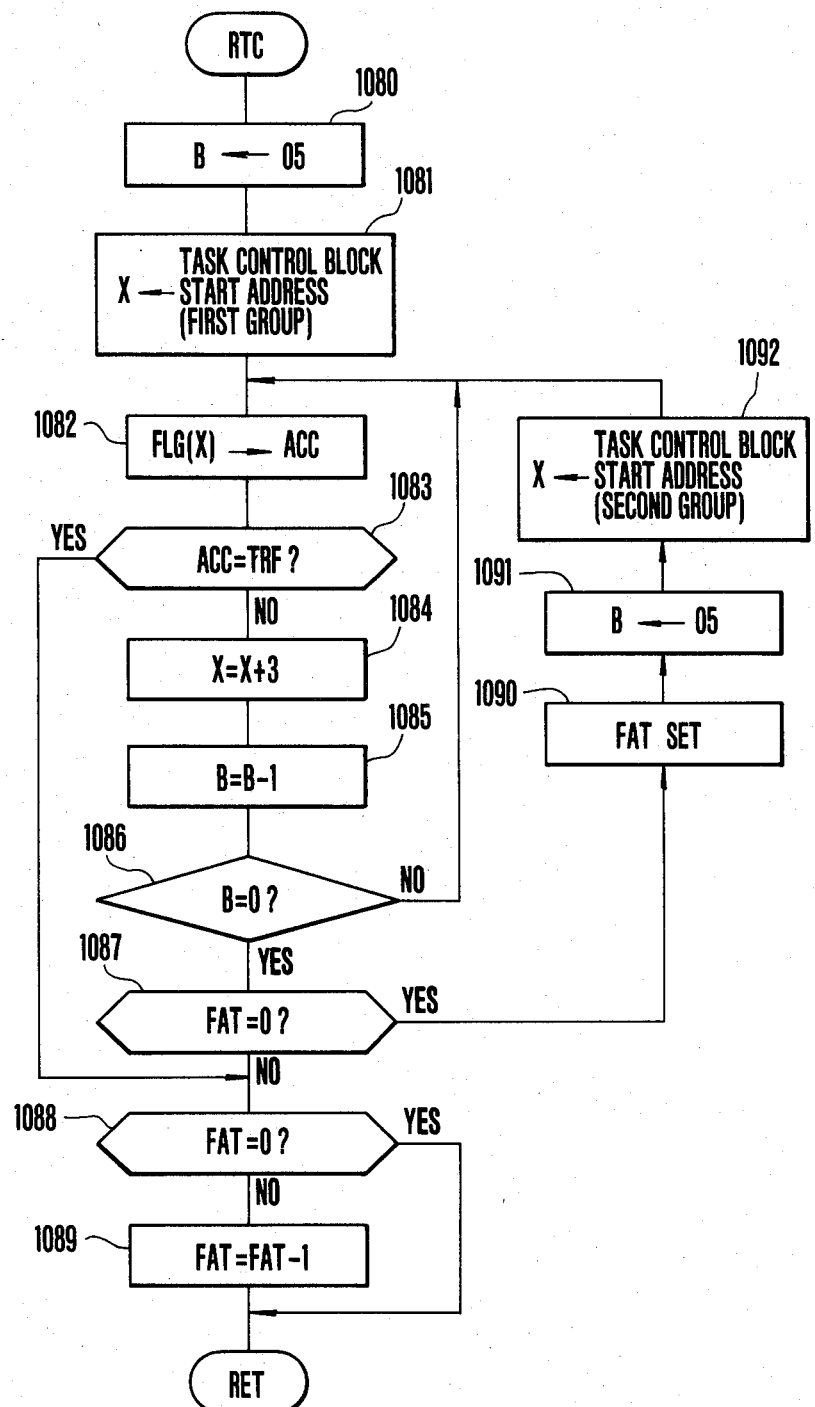
F I G.10

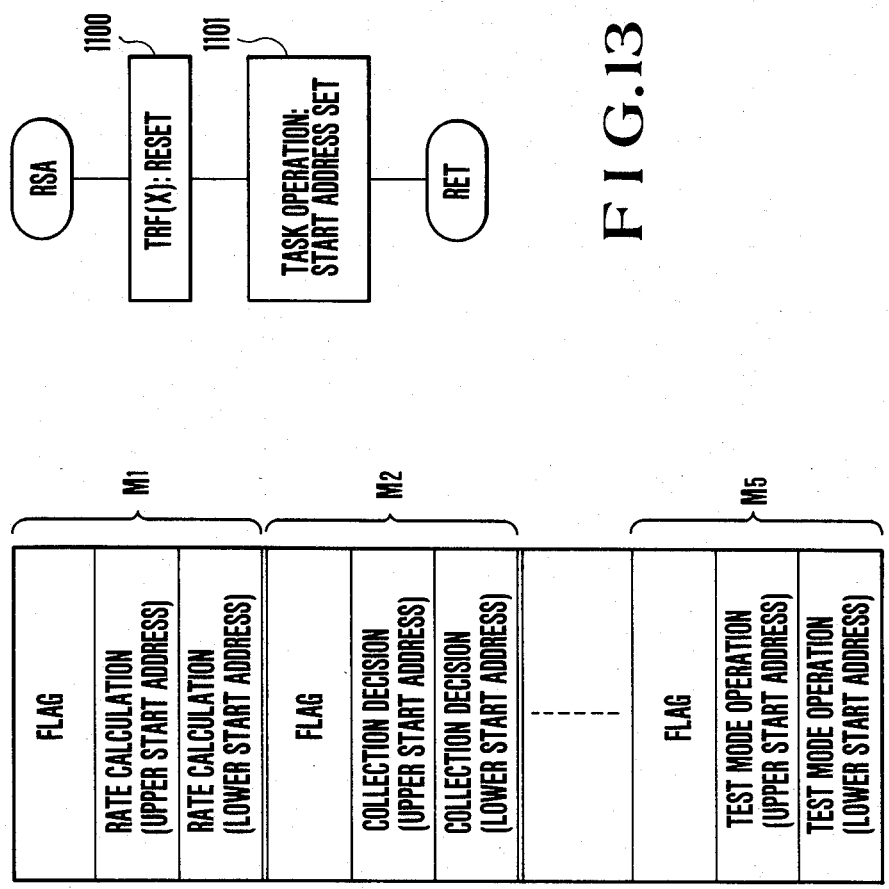
FIG. 13
FIG. 12
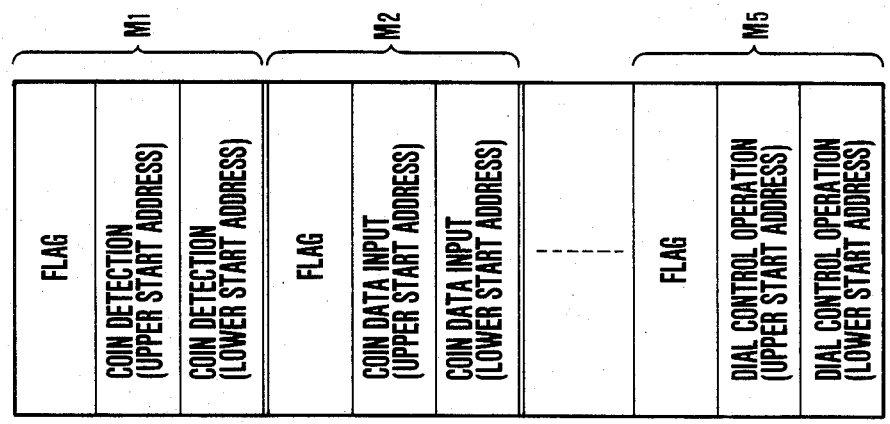
FIG. 11

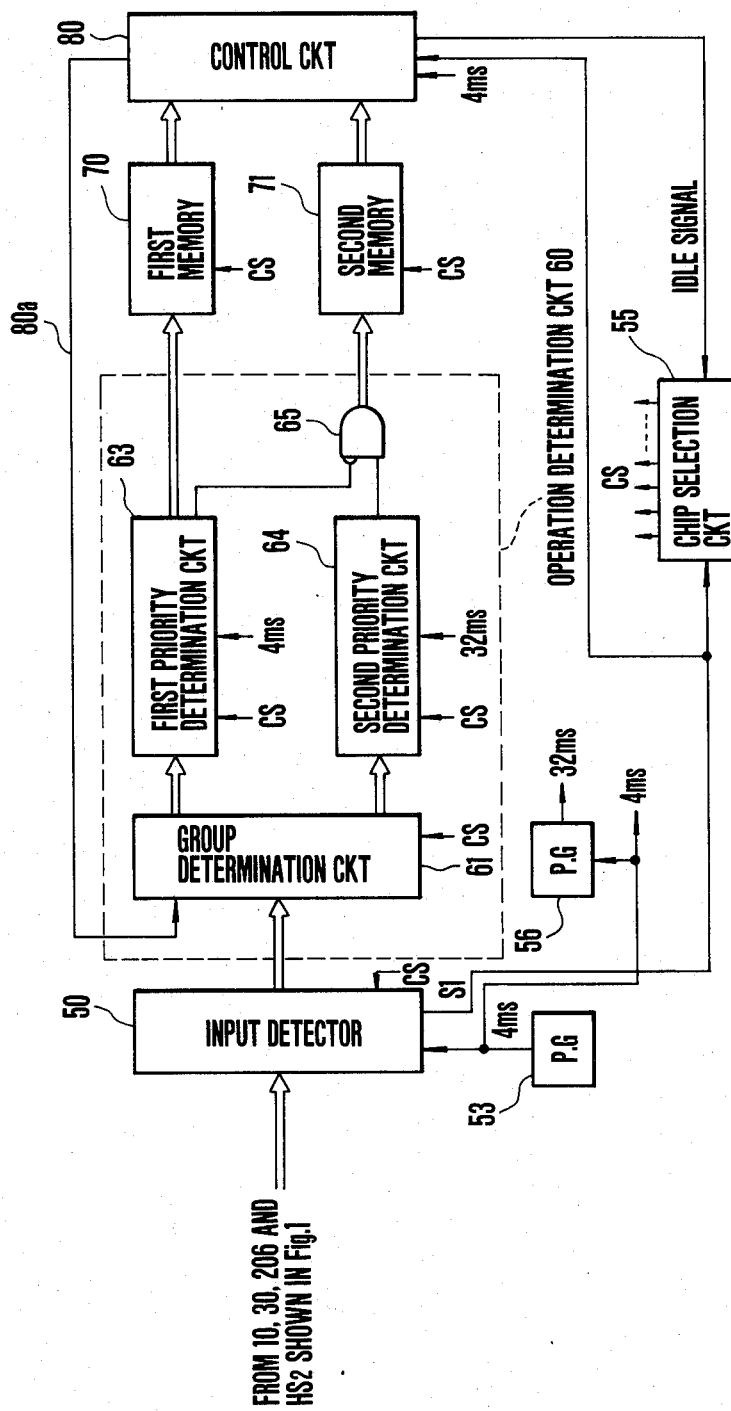

METHOD FOR CONTROLLING TASK PROCESS AND DEVICE THEREOF

BACKGROUND OF THE INVENTION

The present invention relates to a method for controlling task process and a device thereof and, more particularly, to a method for controlling task process and a device thereof used in, for example, a public telephone set which performs speech processing for telephone communication and other processing, such as coin discrimination.

In recent public telephone sets processing, such as speech processing for sending a dial signal and coin discrimination processing are performed by using a stored program type processor, i.e., a microprocessor.

There are different types of processing or operations to be performed in these public telephone sets. One is an irregular request, such as coin discrimination accompanied by coin detection upon insertion of a coin, and the other is a regular, long-term request, such as rate calculation accompanied by reception of a rate signal.

In order to place the conventional public telephone in the different request modes, there are two types of processing control systems: (a) one system wherein an irregular request, such as coin discrimination, requires quick response, so that a special circuit or computer is used to respond only to an irregular request, and (b) the other system wherein a clock frequency or processing cycle is determined on the basis of the response speed for the irregular request, so that both irregular and regular requests can be responded to and predetermined operations can be performed by a single computer.

However, according to system (a), at least two computers must be used and the circuit arrangement becomes complicated. On the other hand, system (b) is operated such that the rate calculation program runs even without the rate calculation request, so that the computer is always operating, resulting in time loss and high power consumption. As a result, system (b) is not suitable for an office power supply type public telephone set since the power consumption thereof is limited.

SUMMARY OF THE INVENTION

It is, therefore, a principal object of the present invention to provide a method for controlling task process and a device thereof having low power consumption and a simple configuration for performing necessary operations.

It is another object of the present invention to provide a method for controlling task process and a device thereof suitably used in a public telephone set.

In order to achieve the above objects of the present invention, there is provided a task processing control device which includes:

a plurality of input means;

task processing means corresponding to the plurality of input means;

selecting means for selecting a task to be executed in accordance with outputs from the plurality of input means; and controlling means having task selection controlling means for supplying the outputs from the plurality of input means to the selecting means at a predetermined processing cycle, disabling means for disabling the plurality of input means, the task processing means, the task selecting means and the task selection controlling means for a disabling time when the task selected by the task selecting means is finished at a task end time and no further output is received from the plurality of input means, and enabling means for enabling the plurality of input means, the task processing means, the task selecting, means and the task selection controlling means in a next predetermined processing cycle.

BRIEF DESCRIPTION OF THE DRAWINGS

FIGS. 4A, 4B and 4C show waveforms of signals for explaining operations in the basic period and in a period which is an integer multiple of the basic period;

FIG. 7 is a memory map showing the timer control block in the public telephone set shown in FIG. 1;

FIG. 8 is a flow chart for explaining input sensing in the public telephone set shown in FIG. 1;

FIG. 10 is a flow chart for explaining a ready task check operation in the public telephone set shown in FIG. 1;

FIGS. 11 and 12 are, respectively, memory maps of task control blocks in the public telephone set;

FIG. 13 is a flow chart for explaining a task start operation; and

FIG. 14 is a block diagram of an operation determination circuit for the public telephone set.

DETAILED DESCRIPTION OF THE PREFERRED EMBODIMENT

Figure 1:
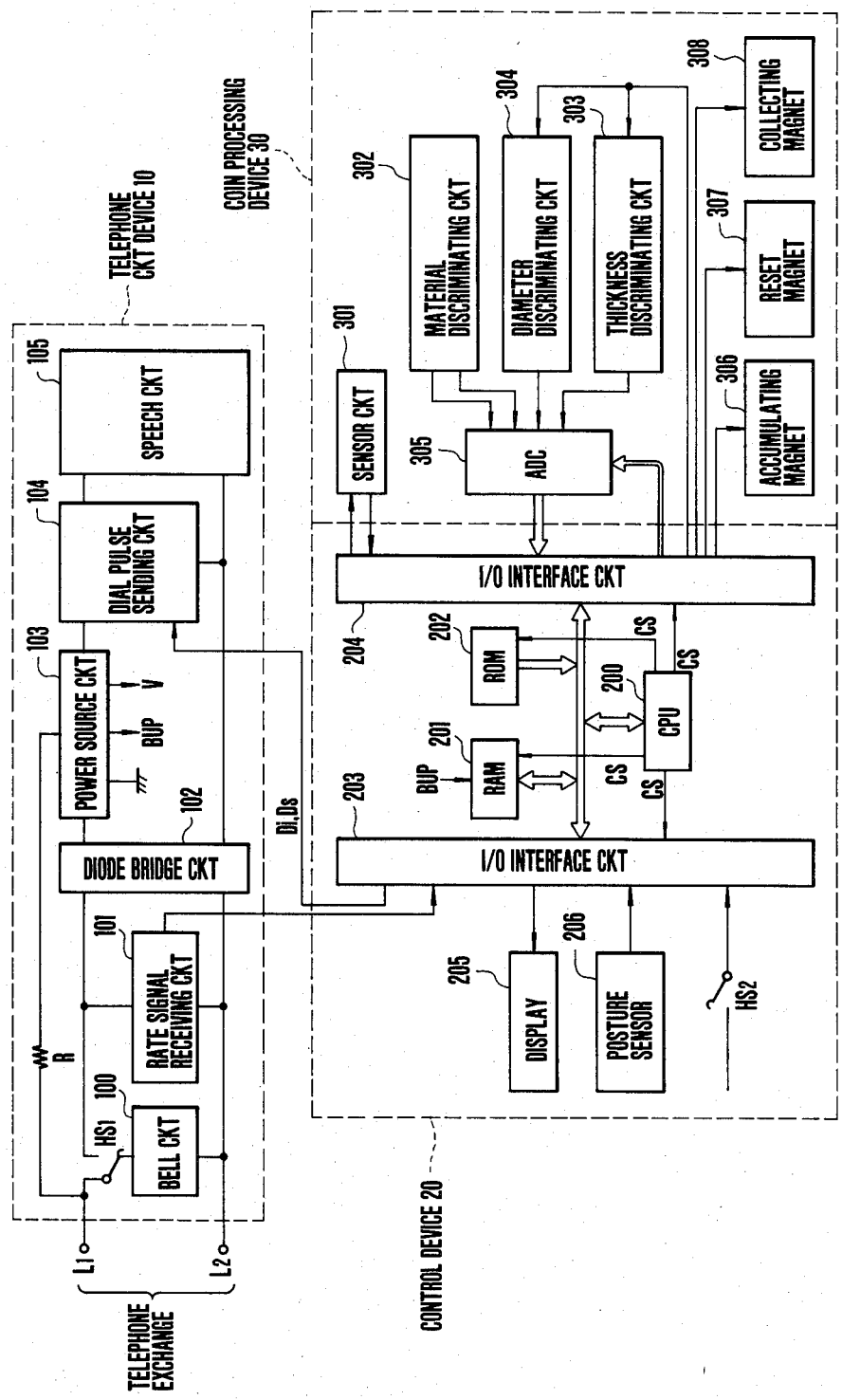
FIG. 1 is a block diagram showing the overall configuration of a public telephone set to which a task process device according to an embodiment of the present invention is applied.

FIG. 1 is a block diagram showing the overall configuration of a public telephone set to which a task process device according to the present invention is applied. Referring to FIG. 1, the public telephone set includes a telephone circuit device 10, a control device 20 for receiving a rate signal from a telephone office through the telephone circuit device 10 and for controlling coin collection or the like, and a coin processing device 30 for discriminating inserted coins in accordance with an instruction generated from the control device 20, collecting the coins in a collection device (not shown) and for returning the coins to a return device (not shown).

The telephone circuit device 10 is connected to the telephone office through office-line terminals L1 and L2. A bell circuit 100 for generating a bell sound when a ringing signal is received through a hook switch contact HS1, a rate signal receiving circuit 101 for detecting a rate signal, a diode bridge circuit 102, a power source circuit 103, a dial pulse sending circuit 104 and a speech circuit 105 are connected between the office-line terminals L1 and L2. When the hook switch contact HS1 is switched to the side opposite to that which the contact HS1 currently contacts upon operation of the hook switch, a DC loop including the speech circuit 105 is formed with respect to the office-line terminals L1 and L2.

The diode bridge circuit 102 normally supplies a DC voltage of a predetermined polarity to the power source circuit 103 and the dial pulse sending circuit 104 irrespective of the polarity of the DC voltage applied from the office across the office-line terminals L1 and L2. The power source circuit 103 supplies a current received from the office through the diode bridge circuit 102 to a capacitor which is then charged, thereby providing an operating power source voltage to a central processing unit (CPU) to be described later. In this case, the power source circuit 103 is connected to the office-line terminal L1 through a resistor R having a high resistance. After the on-hook operation is performed, the power source circuit 103 generates a back-up power source voltage BUP to charge the capacitor and hence to protect the memory content of a random access memory (RAM).

The dial pulse sending circuit 104 receives a dial pulse signal Di and sends it onto an office line. In this embodiment, the dial pulse signal Di is generated by a CPU 200 upon entry of a key input signal at a keyboard (not shown). The dial pulse signal Di is supplied to the dial pulse sending circuit 104 through an I/O interface circuit 203. In this case, a dial shunt signal Ds is supplied to the dial pulse sending circuit 104 to short-circuit the speech circuit 105 through the interface circuit 203 while the dial pulse signal Di is sent from the interface circuit 203 to the dial pulse sending circuit 104. As a result, pulse noise caused by the dial pulse signal Di will not be heard by a caller or calling party. A forced interruption signal is supplied to the dial pulse sending circuit 104 through the I/O interface circuit 203 when the inserted coins have been used up, thereby forcibly disconnecting the telephone circuit.

The control device 20 includes the CPU 200, a random access memory (RAM) 201 for storing processed data, a read-only memory (ROM) 202 for storing parameter data and permanent programs for coin and speech processing, the I/O interface circuit 203 and an I/O interface circuit 204. These interface circuits 203 and 204 exchange signals with various sensors or the like. The control device 20 further includes a display 205 for displaying the value of inserted coins and various types of malfunction, a posture sensor 206 for detecting that the main unit of the telephone set is inclined by a predetermined angle or more, and a hook switch contact HS2 which is opened/closed upon on- and off-hook operations.

The posture sensor 206 is arranged to prevent misuse of the telephone set. When the main unit of the telephone set is inclined by the predetermined angle or more, the forced interruption signal is generated to disconnect the telephone circuit.

When a charge voltage of the capacitor in the power source circuit 103 upon the off-hook operation exceeds a predetermined value, the speech and coin processing programs run in the control device 20. When coin insertion and dialing are performed after the programs have been run, the dial pulse signal Di and the dial shunt signal Ds are generated. On the other hand, when the rate signal detection signal is received by the control device 20 from the rate signal receiving circuit 101 during telephone communication, a drive signal is supplied to a collecting magnet 308 (to be described later). In another case, when the number of collected coins becomes zero or the main unit of the telephone set is abnormally inclined, the forced interruption signal is generated.

The coin processing device 30 includes an optical sensor circuit 301, such as a coin insertion sensor (not shown), a material discriminating circuit 302 including a material detection coil (not shown), a thickness discriminating circuit 303 including a thickness detection coil (not shown), a diameter discriminating circuit 304 including a diameter detection coil (not shown), an A/D converter (ADC) 305 for selectively converting to a digital signal analog output signals from the discriminating circuits 302 to 304, an accumulating magnet 306 for operating an accumulating lever for accumulating authentic coins and a coin selector mechanism, a reset magnet 307, and the collecting magnet 308 for driving a lever for collecting coins in response to the rate signal.

The operation of the public telephone set having the configuration described above will now be described in detail.

In coin processing, all input signals are received by the CPU 200 at a processing cycle of 4 ms, and the signal statuses are discriminated. If an operation is requested to be performed, a task ready flag representing this request is set. When only one task ready flag is set, the operation corresponding to this task ready flag is performed during a remaining period of the processing cycle of 4 ms. However, when a plurality of task ready flags are set, the highest priority operation among the coin detection, display operation, and so on is performed during the remaining period. The next lower priority operation is performed in the next 4-ms processing cycle if a higher priority operation is not requested in this next 4-ms processing cycle, and so on. Therefore, during each 4-ms processing cycle, only a single operation, such as coin detection, is performed. When all these single operations are completed, the CPU 200 is set in the idling mode until an interruption (INT) is requested by the internal reference timer in the CPU 200.

The respective operations are divided into first and second groups in accordance with their priorities. The operations belonging to the first group are performed one in every 4-ms processing cycle in the order from the higher priority operation to the lower one. The operations belonging to the second group are performed one in every 32-ms processing cycle (eight times the 4-ms processing cycle) from the higher priority operation to the lower one when any operation of the first group is not requested at the time of the corresponding 32-ms processing cycle.

In this embodiment, the operations are divided into the first group which is subjected to short-period (4 ms) execution and the second group which is subjected to long-period (32 ms) execution. In addition, the priority sequence is also given in each of the first and second groups in units of operations. When necessary operations of the first and second groups are completed in accordance with the priority sequence, the CPU 200 disables to supply chip selection signals to the RAM 201, ROM 202, and I/O interface circuits 203 and 204, and holds its disabling state. Thereafter the CPU 200 is set in the idling mode, that is in a sleeping state until a next 4-ms processing cycle is started. Normally, chip selection signals are supplied from the CPU 200 to necessary elements in accordance with the content of the program to be executed. With this construction, since the I/O interface circuits, the ROM and the RAM are not accessed during the idling state, low power consumption is established. It should be noted that the CPU 200 having the idling state may be a Model HD6301V available from HITACHI.

The basic operation of the CPU 200 will now be described with reference to FIGS. 4A, 4B and 4C. As shown in FIG. 4A, the basic operation of the CPU 200 is performed in a cycle of 4 ms. During the first 1-ms time period of the 4-ms processing cycle, the CPU 200 receives all input signals and detects the contents or states of these signals. When operations are requested to be performed, the highest priority operation among them is performed during the remaining time period (i.e., 3 ms) of the cycle. Hatched periods A and B, respectively, correspond to the remaining time periods of the respective cycles. In this case, lower priority operations are also requested, they are performed in the subsequent 4-ms processing cycles unless the higher priority operation is requested in the corresponding processing cycles. On the other hand, when no operations are requested as a result of CPU detection, the CPU 200 is set in the idling mode. Therefore, the CPU, excluding a minimum period (e.g., oscillation system for 4-ms processing cycle), together with the ROM and the I/O interface circuits are kept in the disabling state. As a result, useless power consumption can be prevented. FIGS. 4B and 4C are, respectively, detailed charts showing 1-ms periods of the input operations of the 4-ms cycles, respectively.

In fine, the control device 20 about 3 ms (check operation and task processing operation) are subjected to large power consumption, so that the remaining 1 ms of the 4-ms processing cycle can be used for power supply recovery.

The operations performed by the CPU 200 are summarized in Table 1 and have the following priority order or sequence.

TABLE 1

| Operations | Priority Order | |
|---|---|---|
| Coin detection | First group | 1 |
| Coin data input | | 2 |
| Accumulation detection | | 3 |
| Collection detection | | 4 |
| Dialing control operation | | 5 |
| Rate calculation | Second group | 1 |
| Collection decision | | 2 |
| Display operation | | 3 |
| Hook operation | | 4 |
| Test mode operation | | 5 |

Since the operation sequence described above is employed in this embodiment, the RAM 201 has task ready flags corresponding to the respective operations whose data are stored in corresponding memory areas therein. When the task ready flags are selectively set at logic "1", the corresponding operations are performed. When the operations are completed, the corresponding task ready flags are reset at logic "0".

The RAM 201 also has soft timer registers for controlling the ON time of the accumulating magnet 306 and similar functions.

The respective operations shown in Table 1 will be described in detail with reference to the flow charts in FIGS. 2 and 3, FIGS. 5 and 6, and FIGS. 8 to 10. It should be noted that the telephone circuit device 10 and the coin processing device 30 are not directly concerned with the scope of the present invention, and a detailed description thereof will be omitted.

Figures 2, 3:
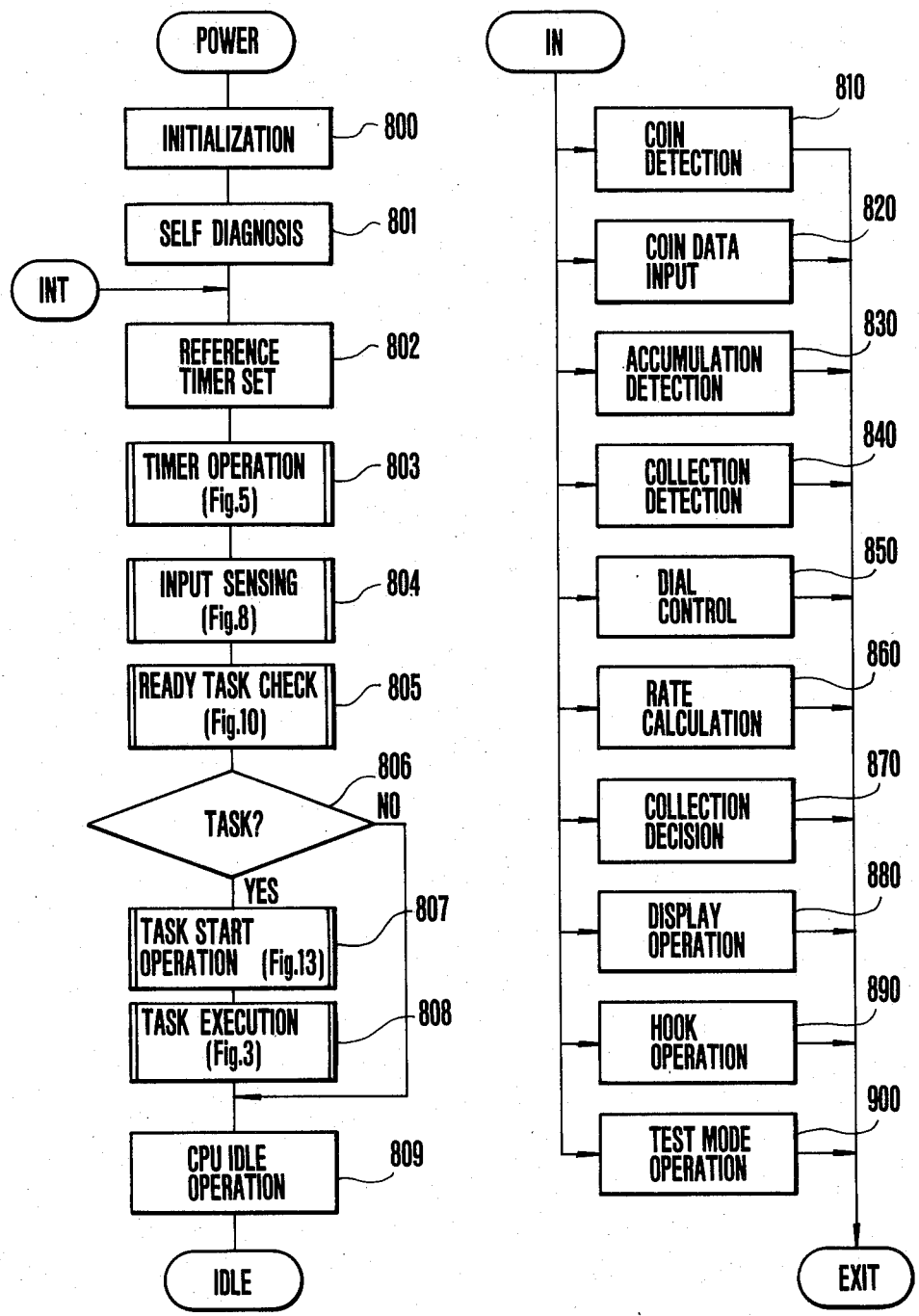
FIGS. 2 and 3 are, respectively, flow charts for explaining the main routine of the public telephone set shown in FIG. 1.

FIG. 2 is a general flow chart for explaining the operation of the CPU 200. When the charge voltage of the capacitor built into the power source circuit 103 reaches a predetermined voltage (+V) upon the off-hook operation, the general flow is started. In step 800, the CPU 200 initializes buffer registers in the I/O interface circuits 203 and 204 and various data registers arranged in the RAM 201. The CPU 200 starts a self diagnosis program and checks in step 801 whether or not the coin sensor and the like are abnormally operated, and whether or not the collecting section (not shown) is full. The contents of the self diagnosis program are described in European Patent Publication No. 0012102A1. When the CPU 200 detects that normal communication can be performed, the flow advances to step 802. However, when an abnormality is detected in the coin sensor or the collecting section is full, the corresponding flag is set first and the flow then advances to step 802. In self diagnosis step 801, when the CPU detects an abnormality, an abnormality display is performed at the display 205 in accordance with the content of the flag in the display operation in step 880 (FIG. 3).

In step 802, the CPU 200 sets a first reference timer to have a processing cycle of 4 ms as the operation cycle of the first group and causes the first reference timer to start. The first reference timer is arranged in the CPU 200. Thereafter, the CPU 200 checks in step 803 whether or not any operating soft timers among the plurality of soft timers arranged to count the ON time of the accumulation magnet 306 or the like are present. If any operating soft timer is present, the count of this soft timer is incremented. Finally, the CPU 200 checks whether or not the count of the soft timer has reached a predetermined value. When "time over" is detected, the CPU 200 deactivates the accumulating magnet 306. In this case, steps 802 to 809 are performed in every 4-ms cycle set by the first reference timer. For example, the ON time of the accumulating magnet 306 becomes several hundred microseconds. For this reason, a first frequency-divider timer which repeats counting every 32-ms processing cycle (eight times the 4-ms processing cycle) and a second frequency-divider timer which repeats counting every 896-ms processing cycle (28 times the 32-ms processing cycle) are provided. The timer having the period of several hundred microseconds is counted by the first frequency-divider timer. When a timer has a period longer than one second, the second frequency-divider timer is used. The frequency-divider timers are arranged as soft timers in a memory area of the RAM 201. The time counting function of each soft timer is not only used to count the ON time of the accumulating magnet 306 but is also used as a timer for supplying, to the corresponding register, read address signals for the program (e.g., accumulation detection) to be performed with predetermined start and end times. Thus, the soft timers are used to count the ON times of the accumulating magnet 306 and the reset magnet 307. In other words, the time counting functions of the respective soft timers are selectively defined by the operations shown in Table 1. After definition of the time counting functions, the count in the timer operation is updated. In this case, the definition of the time counting function is determined by the operation content to be performed with the specified end (time up) time.

In input sensing, the CPU 200 detects all signals supplied thereto in step 804. These signals are output signals generated from the rate signal receiving circuit 101, the posture sensor 206, the hook switch contact HS$_2$, the sensor circuit 301, and output signals from a test switch (not shown) of the coin processing function and a dial button (not shown) of a keyboard. The CPU 200 is operated based on the detection results and checks in ready task checking step 805 whether or not any single operations, such as coin detection are to be performed. If the CPU 200 detects that a single operation is requested, the corresponding task flag is set in the task flag register.

The CPU 200 then checks in step 806 in accordance with the priority order shown in Table 1 whether or not the task ready flags corresponding to the respective single operations are set. If NO in step 806, the flow advances to step 809, and the CPU 200 is set in the idling mode. However, when any one of task ready flags corresponding to the respective operations shown in Table 1 are set, the start address of the highest priority operation corresponding to the "set" task ready flag is set in the program counter in the task start operation. The address set in the program counter is used as the start address of the single operation program in task execution in step 808. In other words, steps 810 to 900 in FIG. 3 are performed. When the single operation or operations are completed, the CPU 200 is set in the idling mode in step 809, so that most of the functions of elements (e.g., the I/O interface circuits 203 and 204, the ROM 202, the RAM 201 and the CPU 200 excluding the 4-ms oscillation system) are set in the disabling state. When a new interrupt signal that indicates a new processing cycle of 4 ms is generated from the first reference timer, the flow returns to step 802. Thereafter, the same operation as described above is repeated. In this case, the task ready flag of each executed single operation is reset when the corresponding start address is set in the program counter. For this reason, the second highest priority operation is performed in the next operation cycle.

The task ready flags for the operations of the second group are subjected to set/reset detection when the CPU 200 detects that the timer period (i.e., 32 ms) of the second reference timer in the ready task check operation in step 805 has elapsed and that none of the task ready flags of the operations of the first group is set. The CPU 200 starts the second reference timer (which defines the 32-ms cycle of the single operations of the second group) in the ready task check operation in step 805 when the operation requests of the first group are not present or completed immediately after the off-hook operation. Thereafter, every time step 805 is performed, the count of the second reference timer is updated. When the timer time has elapsed, the timer is restarted when the operation requests for the first group are not present.

For this reason, the single operations belonging to the second group can be performed when the cycle of 32 ms has elapsed since the operation requests for the first group becomes zero after the off-hook operation. Thereafter, when the operation requests for the first group are not present, the operations of the second group are performed for every 32-ms cycle.

All operations concerning speech processing and coin processing are divided into single operations which are then performed at every 4- or 32-ms cycles in accordance with their priority orders. When the operation is completed, the CPU 200 is set in the idling mode. Therefore, because coin detection belongs to the first group having the highest priority, quick response can be provided at low power consumption.

As is apparent from the above description and FIG. 4A, the basic operation of the CPU 200 is performed such that input operation is performed for the first 1-ms period of each of the 4-ms processing cycles. When the CPU 200 detects that a single operation is to be performed, the operation is performed in the following 2-ms period of the 4-ms processing cycle. The first 1-ms period of the 4-ms processing cycle is shown enlarged in FIG. 4B. In time period C the 4-ms cycle is set in the first reference timer, as indicated in step 802, and the first reference timer starts counting of clock pulses. The timer set operation is followed by the input sensing step 804 in FIG. 2. In practice, the decrement operation (step 1000 in FIG. 5) of a first frequency-divider timer (to be described later) is performed immediately after the timer set operation, although not shown in FIG. 4B. However, this decrement operation is not the main operation of the timer, and a detailed description thereof will be omitted. The CPU 200 receives all signals generated from the rate signal receiving circuit 101, the posture sensor 206, the hook switch contact HS2, and the coin processing device 30. The reception of all signals corresponds to time period D in FIG. 4B. The ready task check operation is performed after this input operation and is illustrated as time period E in FIG. 4B. This operation corresponds to step 805 in FIG. 2. In this step, the CPU checks whether or not single operations, such as coin detection, are requested. If single operations are requested, the corresponding task flags are set in the task flag memory. The task operation of a highest priority in accordance with a predetermined priority order and having a set flag is performed after the 1-ms period of the 4-ms processing cycle has elapsed. This operation corresponds to steps 807 and 808 in FIG. 2 and continues for substantially 2 ms.

The single operations are performed for every 32-ms cycle in accordance with the outputs from the first reference timer and first and second frequency-divider timers, as shown in FIG. 4C. This 1-ms period includes all operations performed in that of the 4-ms cycle. In addition, the 1-ms period in FIG. 4C also includes time period F for timer operation. The operations of the second group are performed for every 32-ms processing cycle when the task flags of the operations of the first group are not set. The timer operation associated with the task operation of the second group is performed in a time period after the time period C for the timer set operation. The timer operation for ending operation of the elements executed in the task processing is performed in this time period F, and a detailed description will be made with reference to FIG. 5. The decrement operation of the first frequency-divider timer which is already started, and the initialization of the first frequency divider timer are performed. For example, "08" is set in the first frequency-divider timer of the down counter, so that the first frequency-divider counter starts counting the number of the 4-ms cycles at a 32-ms cycle which is eight times the 4-ms cycle. An output from the first frequency-divider timer is frequency-divided to cause the second frequency-divider counter to count the number of the 32-ms cycle at a 896-ms cycle which is 28 times the 32-ms processing cycle. The counts of the first frequency-dividers timer FAT and second frequency-divider timer SAT are shown above the waveform in FIG. 4A. This operation is performed in step 803 in FIG. 2. The input sensing operation and the ready task check operation are performed after the timer operation. When the 1-ms period has elapsed, the task operation is performed during the remaining period of the 4-ms cycle.

The operations of the first group are shown in steps 810 to 850 in FIG. 3, respectively. Coin detection (step 810) among these operations has a higher priority than those of other operations when the coin insertion is detected by the optical sensor circuit 301 and the coin detection task ready flag is set. In coin detection, the coin discrimination timer is started to prevent erroneous accumulation when the coins are continuously inserted. At the same time, the operating power source voltage is applied to the thickness discriminating circuit 303 for discriminating the thickness of the coin and the diameter discriminating circuit 304 for discriminating the diameter of the coin, only while the coin discrimination timer is operated.

In this case, the power ON/OFF operation of the circuits 303 and 304 is performed through the I/O interface circuit 204.

Coin data input operation step 820 is performed when the coin data input operation task ready flag is set by the coin discrimination timer to represent the coin data input operation request. In this coin data input operation, the material, diameter and thickness data of the coin are supplied to the CPU 200 through the A/D converter 305 and the I/O interface circuit 204. The input data are respectively compared with the preset data, so that the authenticity and type of the inserted coin are discriminated. As a result, when the inserted coin is authentic, the accumulating magnet 306 is driven to guide this authentic coin along the accumulation path. However, when the inserted coin is detected to be a false coin, the accumulating magnet 306 will not be driven. The false coin is returned to the coin return port.

The accumulation detection in step 830 is performed when the coin reaching the accumulation path is detected by the accumulation sensor and the corresponding task ready flag is set. In this accumulation detection, a denomination of the inserted coin is determined in accordance with the data representing the type of the inserted coin, and the denomination data is stored in a memory area of the accumulation amount memory in accordance with the priority order of accumulation. At the same time, a remaining amount of coins already stored in the collecting device (not shown) and the accumulated amount stored in the accumulation memory are added, so that an amount indicating the remaining time of speech is calculated. In addition, the accumulating magnet 306 is deenergized. When a predetermined time has elapsed, the reset magnet 307 is energized for a predetermined time, thereby switching to the return side the accumulation lever (not shown) which has been moved in the accumulation side by energization of the accumulating magnet 306. In accumulation detection, the task ready flag is set to display the amount which indicates the remaining time of speech. Thereafter, when the display operation for the second group is permitted, the amount indicating the remaining time of speech is displayed in number on the display 205.

Collection detection in step 840 is performed when the collecting magnet 308 is driven upon reception of the rate signal to move a collection lever (not shown) to the collection side, thereby causing a collection sensor to detect through the collection lever the coin which reaches the collection path, and when the corresponding task ready flag is set in accordance with the detection result. In this collection detection, the collected amount is subtracted from the amount stored in the accumulation memory, and an amount indicating the remaining time of speech can be calculated in the same manner as in accumulation detection. The collecting magnet 308 is deenergized, so that the collection lever held in the collection side upon energization of the collecting magnet 308 is returned to the non-collection side.

The dial control operation in step 850 is performed when dial button operation is performed after the off-hook operation is performed and when at least one authentic coin is accumulated in the accumulation path, and when the corresponding task ready flag indicating the dial control request is set upon detection of rising (or falling) edge of the dial signal which is caused by dial button operation. In this dial control operation, the dial signal Di and the dial shunt signal Ds are supplied to the dial pulse sending circuit 104 through the I/O interface circuit 203.

The respective operations belonging to the second group are shown in steps 860 to 900 in FIG. 3. The rate calculation operation in step 860 is performed when the task ready flag which indicates the rate calculation request is set upon detection of the leading edge of the rate signal. In this rate calculation operation, a task ready flag which indicates the collection decision request of the next step 870 is set. The collection decision operation is performed when a new operation cycle (i.e., 32 ms) of the second group is set. When the amount indicates a sufficient remaining time of speech, the rate calculation amount is subtracted from the amount indicating the sufficient remaining time. However, when the remaining amount is smaller than the rate calculation amount, the collecting magnet 308 is energized to collect the coins stored in the accumulation path. One accumulated coin is collected in the collection device. For this purpose, the collecting magnet 308 is energized to guide the coin in the collection path, and the collection sensor performs collection detection step 840.

The display operation in step 880 is performed to display an amount which indicates a remaining time of speech when another coin is accumulated in the accumulation path or is collected in the collection device and the corresponding task ready flag is set. On the other hand, when the collection device is filled with coins or the coin insertion sensor is abnormally operated, the display operation is performed under the condition that the corresponding task ready flag is set. The amount which indicates the remaining time of speech or the abnormal state is displayed at the display 205 in accordance with the contents of the respective task ready flags. The display operation task ready flag is set every time a display output is required for the self diagnosis, the accumulation detection or collection detection.

The hook operation in step 890 is performed when the leading edge of the output signal from the hook switch contact HS2 upon off- or on-hook operation or a reverse flow (caused by inclination of the main unit of the public telephone set) of the coin is detected by a reverse flow sensor, (not shown) and the hook operation task ready flag is set in accordance with the detection of the leading edge of the output signal or the reverse flow detection.

In the hook operation, when the task ready flag is set upon the on- or off-hook operation, the corresponding operation is performed. However, when the task ready flag is set upon the reverse flow detection, the forced interruption signal is supplied to the dial pulse sending circuit 104, thereby forcibly interrupting communication.

The test mode operation in step 900 is performed when a test switch (not shown) is operated at the time of maintenance operation, and the test mode operation task ready flag is set. In the test mode operation, all functions are tested.

Figure 5:
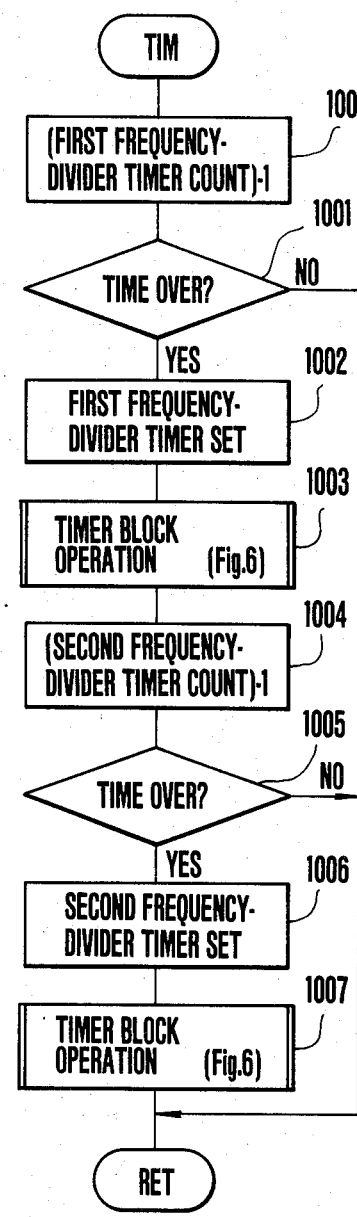
FIGS. 5 and 6 are, respectively, flow charts for explaining the timer operation of the public telephone set shown in FIG. 1.
Figure 6:
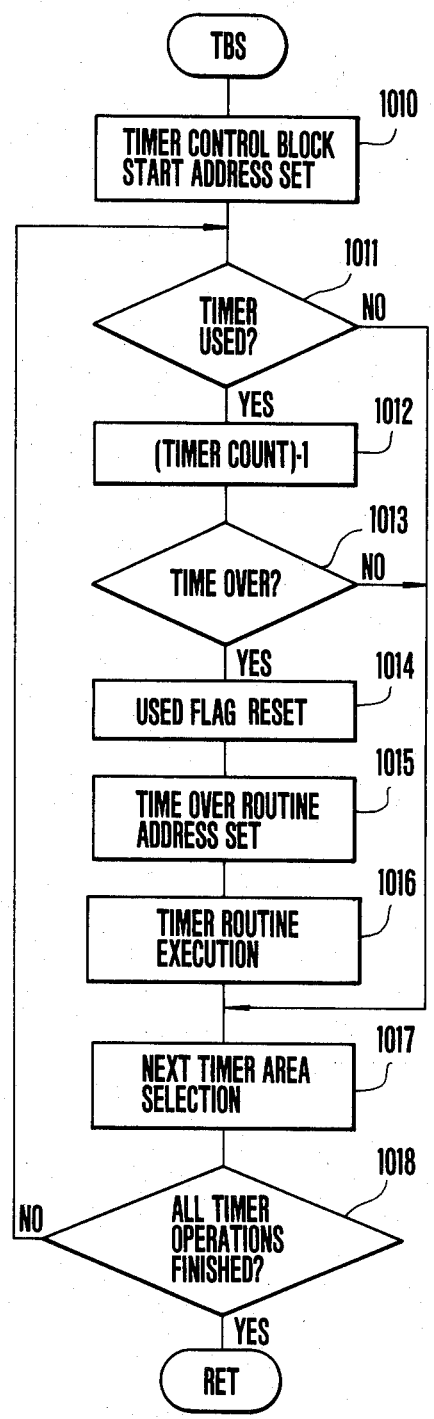

FIGS. 5 and 6 are flow charts for explaining the timer operation in step 803 in FIG. 2. In step 1000, the CPU 200 decreases the count (timer time of 32 ms) of the first frequency-divider timer by one unit (4 ms). The CPU 200 then checks in step 1001 whether or not the count of the first frequency-divider timer becomes zero. If YES in step 1001, the CPU 200 sets the first frequency-divider timer with the 32-ms processing cycle in step 1002, so that this timer is restarted. However, if NO in step 1001, the subroutine returns to the main routine in FIG. 2, and the input sense operation is performed.

When the first frequency-divider timer is restarted under the control of the CPU 200, the CPU 200 checks in step 1003 the statuses of the plurality of soft timers for receiving the output from the first frequency-divider timer. When the CPU 200 detects any soft timer in use, the timer time of this soft timer is decreased by one unit (32 ms). In addition, when the CPU 200 detects any soft timer which is set in the "time over" state (i.e., the count thereof is zero), the corresponding operation is performed. As shown in FIG. 7, the soft timer is constituted by a memory area of the RAM 201 and includes a flag memory area M1 for storing time count data flags, a memory area M2 for storing timer count data (timer time data) which represents a time period from the start time to the current time, and memory areas M3 and M4 of upper and lower addresses of the program stored in the ROM 202 and to be executed in the "time over" state. A plurality of soft timers constitute a first timer block which receives the output generated from the first frequency-divider timer.

As the detailed flow of the timer operation is shown in FIG. 6, in step 1010, the CPU 200 sets the start address of the first timer block and reads out the flag data from the memory area M1 of the first soft timer. The CPU 200 checks in step 1011 whether or not the first soft timer is being used. If NO in step 1011, the flow jumps to step 1017 wherein the start address of the second soft timer is set. The flow returns to step 1011 through the decision step 1018, and the flag data is read out from the memory area M1 of the second soft timer. The CPU 200 then checks in step 1011 whether or not the second soft timer is being used. If YES in step 1011, the flow advances to step 1012 wherein the count of the second soft timer is decreased by one unit (32 ms). The CPU 200 checks in step 1013 whether or not the preset timer time has elapsed. When the count of the memory area M2 of the second soft timer is set to be "0" (i.e., when the second soft timer is set in the "time over" state), the flag is reset in step 1014. In step 1015, the start addresses of the program to be performed in the "time over" state of the corresponding timer are read out from the memory areas M3 and M4 of the second soft timer. The readout address data are set in a program counter. In step 1016, this program is performed. Thereafter, in step 1017, the CPU 200 sets the start address of the third soft timer. The flow returns to step 1011 through the decision step 1018. However, when the count of the second soft timer does not become zero, the flow jumps from step 1013 to step 1017. The start address of the third soft timer is set, and the flow returns to step 1011 through the decision step 1018.

The CPU 200 repeats the operation described above. When the operations of the soft timers using the output generated from the first frequency-divider timer are completed, the flow advances to step 1004 of FIG. 5 through the decision step 1018.

In step 1004, the CPU 200 decreases the timer time (896 ms=32 ms×28) of the second frequency-divider timer by one unit (32 ms). The CPU 200 then checks in step 1005 whether or not the count of the second frequency-divider timer becomes zero. When the CPU 200 detects that the count of the second frequency-divider timer is zero, the CPU 200 sets the second frequency-divider timer with the 896-ms processing cycle in step 1006, so that this timer is restarted. However, if the CPU 200 detects that the count of the second frequency-divider timer is not zero, the subroutine returns to the main routine in FIG. 2, and the input sensing operation is performed.

When the CPU 200 restarts the second frequency-divider timer, in step 1007, the same operation (step 1003) as described above with reference to the plurality of soft timers using the output generated from the second frequency-divider timer is performed, and the subroutine returns to the main routine in FIG. 2.

Figure 9:
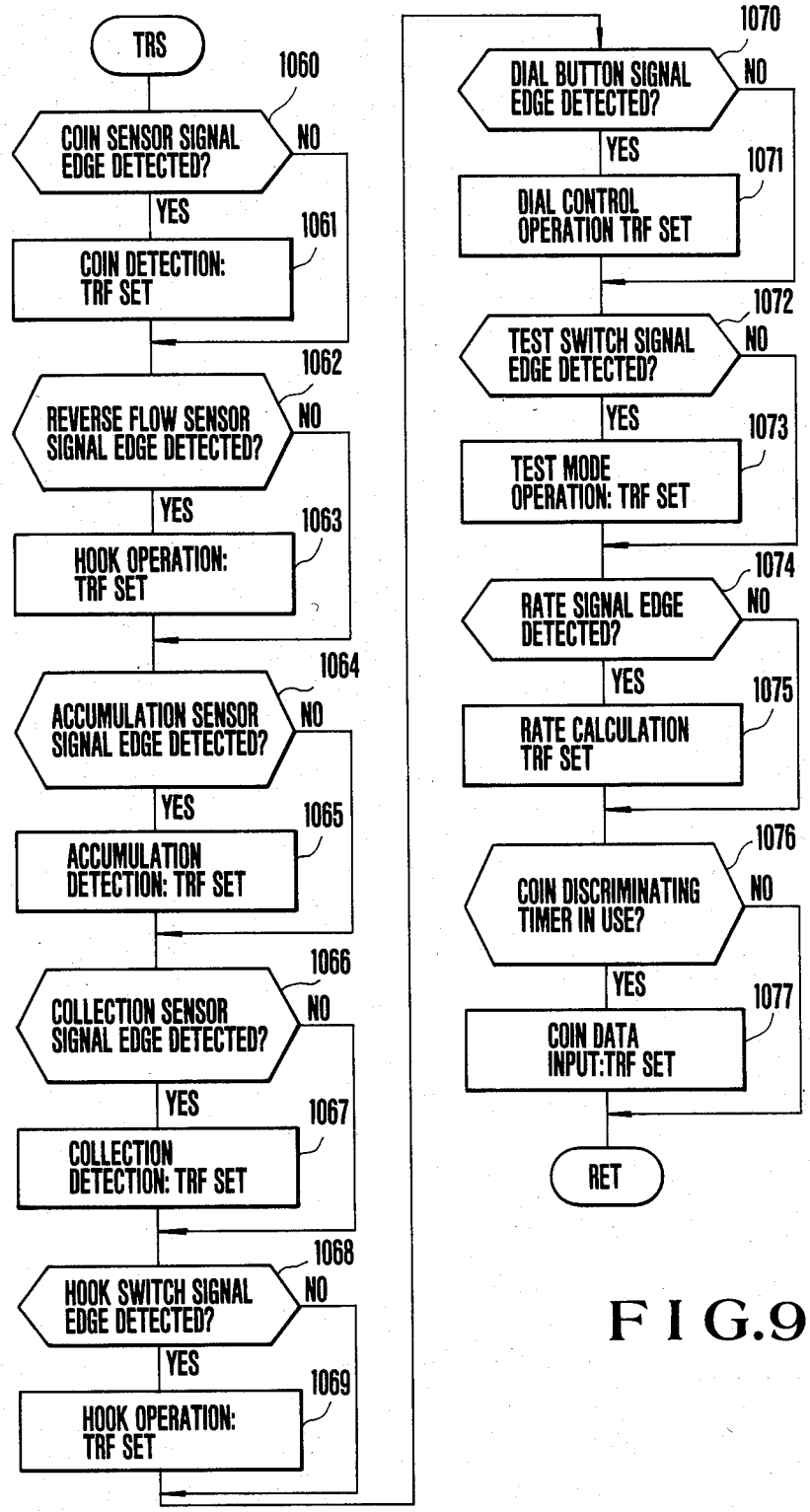
FIG. 9 is a flow chart for explaining a task ready flag set operation of the input sensing operation shown in FIG. 8.

FIGS. 8 and 9 show a detailed flow of the input sensing operation in step 804 of FIG. 2. In step 1050, the CPU 200 enables a read signal to read all input signals supplied thereto. In step 1051, the CPU 200 detects the state of all input signals. In step 1052, the CPU 200 disables the read signal. In step 1053, the task ready flags which represent single operation requests, such as coin detection requests, are set in accordance with the signal state detection under the control of the CPU 200.

FIG. 9 shows a detailed flow of step 1053. When the CPU 200 detects the edge (leading edge or trailing edge) of the output signal generated from the coin insertion sensor in accordance with the input signal state detection, the CPU 200 determines that the coin has been already inserted, so that the task ready flag (TRF) for coin detection is set in step 1061. On the other hand, when the CPU 200 detects the edge of the output signal generated from the reverse flow sensor in step 1062, the CPU 200 determines that a reverse flow has occurred and the task ready flag for the hook operation is set in step 1063. When the CPU 200 detects the edge of the output signal generated from the accumulation sensor in step 1064, the CPU 200 determines that the coin has reached the accumulation path and the task ready flag for the accumulation detection is set in step 1065. When the CPU 200 detects the edge of the output signal generated from the collection sensor in step 1066, the CPU 200 determines that the accumulated coin has reached the collection device, so that the task ready flag for the collection detection is set in step 1067. When the CPU 200 detects the edge of the output signal generated from the hook switch contact HS2 in step 1068, the CPU 200 determines that the on- or off-hook operation has been performed, so that the task ready flag for the hook operation is set in step 1069. When the CPU 200 detects the edge of the output signal generated from the dial button in step 1070, the CPU 200 determines that dialing has already been performed, so that the task ready flag for the dial control operation is set in step 1071. Similarly, when the CPU 200 detects the edge of the output signal generated from the test switch in step 1072, the CPU 200 determines that the maintenance operation has been performed, so that the task ready flag for the test mode operation is set in step 1073. When the CPU 200 detects the edge of the rate signal in step 1074, the CPU 200 determines that the rate signal has been received, so that the task ready flag for the rate calculation operation is set in step 1075. When the CPU 200 detects that the coin discrimination timer is being operated by referring to its flag in step 1076, the CPU 200 sets the task ready flag for the coin data input operation in step 1077 so as to start the discrimination of the inserted coin.

In this manner, the CPU 200 sets the task ready flags for the respective single operations in accordance with the statuses of all input signals, and the corresponding subroutines are ended and the flow returns to the main routine in FIG. 2. When the CPU 200 detects the edge of the output signal generated from the posture sensor 206, the task ready flag for the hook operation is set.

FIG. 10 shows a detailed flow of the ready task check operation in step 805 of FIG. 2. The CPU 200 sets value "05" in an index B in step 1080. The value "05" represents the number of single operations of the first group. The statuses of the respective single operations of the first group, the start address data of a task control block having the start address data of the respective single operations, are temporarily stored in the X register. The start address data of the task control blocks are sent onto the address bus. More particularly, the task control block for controlling the respective single operations of the first group includes five memory areas M1 to M5 for each single operation, such as coin detection, as shown in the memory map of FIG. 11. The memory areas store the task ready flags for the respective single operations, current status flags (e.g., flags for indicating the operation statuses of the single operations), and the address data (from the start address to the third address in the order named) of single-operation programs stored in the ROM 202.

In order to detect which one of the single operations of the first group is requested, the CPU 200 supplies the start address data of the task control block onto the address bus in step 1081. In step 1082, the flag data of coin detection is transferred from the start address of the task control memory area M1 to the accumulator (ACC) in the CPU 200. Thereafter, the CPU 200 checks in step 1083 in accordance with the content of the accumulator whether or not the coin detection task ready flag (TRF) is set. If YES in step 1083, the flow returns to the main routine of FIG. 2 through steps 1088 and 1089, and coin detection is performed.

However, when the task ready flag for coin detection is not set, the flow advances from step 1083 to step 1084. In step 1084, value "3" (decimal notation) is added to the address data stored in the X register. A sum is sent as the address data of the task control block onto the address bus. Thereafter, in step 1085, the content of the index B is decremented by one. After the CPU 200 discriminates that the updated value is not zero in step 1086, the flow returns to step 1082. In step 1082, the coin data input operation flag data is transferred from the start memory area of the task control memory area M2 to the accumulator in the CPU 200. In the same manner as described above, the CPU 200 checks in accordance with the content of the accumulator whether or not the coin data input operation task ready flag is set. When the CPU 200 determines that this flag is set, the flow returns to the main flow of FIG. 2, and the coin data input operation is performed.

In this manner, the CPU 200 checks the logic states of the task ready flags. When the CPU 200 detects the task ready flag of logic "1", the subroutine is ended and the flow returns to the main routine shown in FIG. 2 wherein the corresponding single operation is performed. However, when the CPU 200 cannot detect any task ready flag of logic "1" before the contents of the index B become zero (i.e., when no request for the single operations of the first group is detected), the flow advances to step 1087 through step 1086. In step 1087, the CPU 200 checks whether or not the timer time (FAT) of the second reference timer (processing cycle of 32 ms) for defining the operation cycle of the single operations of the second group has elapsed (i.e., whether or not the count of the second reference timer becomes zero). If YES in step 1087 (i.e., if FAT=0), the CPU 200 sets the second reference timer with the 32-ms processing cycle in step 1090. In step 1091, value "05" which represents the number of single operations of the second group is set in the index B. Thereafter, in the same manner as in the case wherein the presence/absence of the request for the single operation of the first group is detected in steps 1082 to 1086, the presence/absence of the request for the single operation of the second group is detected.

As shown in a memory map of FIG. 12, each task control block for controlling the single operations of the second group consists of five memory areas M1 to M5 of each single operation, such as rate calculation. The memory areas store the task ready flags for the respective single operations, current status flags (e.g., flags for indicating the operation statuses of the single operations), and the address data (from the start address to the third address in the order named) of single-operation programs stored in the ROM 202.

In the same manner as the detection of the presence/absence of the request of the single operation of the first group, the CPU 200 causes the X register to temporarily store the start address data of the task control block of the second group in step 1092. The start address data of the task control block is supplied onto the address bus. The CPU 200 detects the presence/absence of the request of the single operation of the second group in steps 1082 to 1086. As a result, when the CPU 200 detects the request for any one of the single operations of the second group, the flow jumps from step 1083 to step 1088. The flow then returns to the main routine of FIG. 2 through steps 1088 and 1089, and the corresponding single operation is performed.

The addresses are assigned to the task control blocks of the first and second groups in accordance with the priority operations. Therefore, the presence/absence of the requests for the single operations of the first and second groups is detected from the higher priority order to the lower priority order. The presence/absence of the requests for the single operations belonging to the second group is detected only when the request for none of the single operations of the first group is present and the timer time of the second reference timer has elapsed. This is because steps 1086 and 1087 are given as conditions for the detection of the presence/absence of the request for the second group.

In this case, the timer time of the second reference timer is decremented by 1 in step 1089 every time the ready task check operation of FIG. 10 is performed. When the timer time (FAT) of the second reference timer has elapsed in step 1088, the timer time is not set again in the second reference timer in step 1089 so as to prevent the timer count of the second reference timer from being negative.

FIG. 13 shows a detailed flow of the task start operation in step 807 of FIG. 2. In step 1100, the CPU 200 resets the task ready flag (TRF) in the given task control memory area wherein the single operation request of this task ready flag is detected first. Thereafter, in step 1101, the start address of the single operation program is read out from the given task control memory area. This start address is set in the address counter. Thereafter, the flow returns to the main routine of FIG. 2, and the corresponding single operation is performed in accordance with the program.

As has been apparent from the above description, the operations concerning speech processing and coin processing are classified as single operations whose priority order is predetermined. Operation requests are detected in the priority order, and the single operations are performed in a 4- or 32-ms cycle. When the single operations are completed, the CPU 200 is set in the idling state. Therefore, the irregular single operation, such as coin insertion detection, belongs to the first group which has a higher priority than the second group, so that quick response to the irregular operation can be provided. In addition, when the irregular operation is completed, the operations of the second group are performed for at least a processing cycle of 32 ms. During this processing cycle, the CPU 200 is set in the idling state, thereby achieving low power consumption.

According to the embodiment as described above, there is provided a public telephone set processing control system, wherein respective processing contents of a public telephone set are divided into a plurality of groups in accordance with their priorities, a priority sequence of operations in each of the groups is specified, execution requests for the respective processing contents are detected for every basic period, a predetermined single sequence of the highest priority group is performed during the basic period in accordance with the detection result obtained, and single sequences of groups including the highest priority group and the lower priority groups are performed at periods which are integer multiples of the basic period. The public telephone set can perform processing in a simple manner at low power consumption. Therefore, the control system can be applied to the office power supply type public telephone set whose power consumption is limited, thereby providing a telephone set with high performance at low cost.

In the above embodiment, the order of operation data in the memory is predetermined in units of groups and in accordance with the priority order. The addresses are sequentially accessed to perform the subsequent operations. However, the groups and the priority orders can be controlled by software. FIG. 14 is a block diagram of an improved control system of the system of the above embodiment. Referring to FIG. 14, data of the public telephone set are supplied to an input detector 50 from the telephone circuit device 10, the coin processing device 30, the posture sensor 206 and the hook switch contact HS2 shown in FIG. 1. The input detector 50 receives the input data in response to a pulse (having a relatively short processing cycle of 4 ms) generated from a pulse generator (P.G) 53. An output from the input detector 50 is supplied to an operation determination circuit 60. The pulse generator 53 normally generates 4-ms pulses.

When the input detector 50 detects no input, it supplies an idle signal S1 to a chip selection circuit 55 and a control circuit 80. The chip selection circuit 55 controls enabling/disabling operations of elements 50, 61, 63, 64, 70 and 71 in accordance with the pulse generated from the pulse generator 53, the idle signal S1 and the output from control circuit 80 (to be described later). A pulse generator 56 also receives the output (4 ms) from the pulse generator 53 and normally generates a 32-ms pulse in synchronism with the 4-ms pulse. A group determination circuit 61, first and second priority determination circuits 63 and 64, and a NAND gate 65 constitute the operation determination circuit 60.

The group determination circuit 61 analyzes the signal supplied through the input detector 50 and determines which group shown in Table 1 includes the single operation represented by this input signal. For example, when the signal represents coin detection, this signal belongs to the first group. However, when the signal represents the hook operation, it belongs to the second group. In the previous embodiment, the position of the supplied signal stored in the RAM clearly represents the group to which this signal belongs and the priority order of the group. However, in FIG. 14 a given signal can be compared with reference data to determine which group includes the single operation represented by the given signal. The outputs from the group determination circuit 61 are supplied to the first and second priority determination circuits 63 and 64, respectively. The first priority determination circuit 63 determines a priority order of the signals belonging to the first group. Every time the first priority determination circuit 63 receives the 4-ms pulse from the pulse generator 53, an output is supplied from the first priority determination circuit 63 to a first memory 70. The first memory 70 is accessed by the output from the first priority determination circuit 63 and a program stored in a predetermined memory location in the first memory 70 corresponding to a task to be executed is read out. At the same time, the output of logic "1" from the first priority determination circuit 63 is supplied to the NAND gate 65 which is then disabled.

The second priority determination circuit 64 determines the highest priority signal among the signals of the second group which are supplied from the group determination circuit 61. The highest priority signal is supplied to the NAND gate 65 in response to a 32-ms pulse. The NAND gate 65 is enabled only when the output from the first priority determination circuit 63 is not supplied to the NAND gate 65 and then the output generated from the second priority determination circuit 64 is supplied to a second memory 71. The second memory 71 is accessed by the output from the second priority determination circuit 64 and a program stored in a predetermined memory location in the second memory 71 corresponding to a task to be executed is read out. In this case, the first and second priority determination circuits 63 and 64 may compare outputs generated from the group determination circuit with reference data to select the highest priority signals, respectively. Alternatively, as described in the above embodiment, the priority order may be determined in accordance with storage locations of the respective memories. The control circuit 80 performs predetermined control operations in accordance with the programs read out from the first and second memories 70 and 71.

When the control circuit 80 completes the task in accorance with the program, it is put in the idling state.

At the same time, it supplies an idle signal to the chip selection circuit 55 s that no chip selection signal (a disabling signal) is sent out to the elements 50, 61, 63, 64, 70 and 71 so that they are deenergized to be maintained in a sleeping state.

When the control circuit 80 receives a next 4-ms output from the pulse generator 53, it changes the sleeping state into an enabling state to receive the output of the first or second memory 70 or 71. At the same time, sending of the idle signal to the chip selection circuit 55 is stopped.

As described above, the idle signal S1 is sent out from the input detector 50 when no signal is sent out. The idle signal S1 is supplied to the chip selection circuit 55 and the control circuit 80 to set them in disabling states. These disabling states are released when the next 4 ms-output from the pulse generator 53 is generated. During execution of, a task, such as the rate calculation, an additional task, such as the decision of coil collection, is required. In such case, the control circuit 80 performs a forced interruption program where there is no coin when a rate signal is received. Then the control circuit 80 supplies a forced interruption control signal to the group determination circuit 61 through a line 80a to cause execution of a program of the forced interruption stored in the second memory 71. By way of simplicity, the description with reference to FIG. 14 is confined only to the part associated with the main feature of the above embodiment. In addition to the telephone set, the present invention can be applied to other types of devices for performing a plurality of tasks.

What is claimed is:

1. A task processing control device comprising:
   generation means for cyclically generating base signals, each base signal having a period longer than the period of time required for processing a single task;
   detection means for detecting received processing demands in response to each of said base signals;
   memory means for storing, in predetermined memory locations, a plurality of task processing programs, each of said task processing programs being associated with a respective one of said processing demands;
   selection means for selecting a single processing demand during each base signal, said single processing demand selected from among all of the processing demands detected by said detection means and not previously selected;
   address designation means for designating in said memory means the location of the task processing program associated with said selected single processing demand;
   task execution means for executing the task processing program in said memory location designated by said address designation means; and
   idling mode control means for disabling said detection means, said selection means, said address designation means and said task execution means in response to the completion of the execution of said designated task processing program and in response to said selection means not selecting a task processing demand for execution.

2. A task processing control device according to claim 1 further comprising:
   a rechargeable power source for supplying electrical power to said generation means, detection means, memory means, selection means, address designation means, task execution means and said idling mode control means; and
   means for recharging said rechargeable power source during the time when said idling mode control means has disabled said detection means, selection means, address designation means, and task execution means.

3. A task processing control device for use in a public telephone set of the type having a speech circuit and a dial signal generation circuit disposed on the loop line of the telephone office, a receiver and a transmitter coupled with said speech circuit, and a coin processing unit, said task processing control device comprising:
   signal generation means for cyclically generating base signals, each base signal having a period longer than the period of time required for the processing of any single one task of a set of tasks comprising coin processing, dial control processing, hook processing and charge processing;
   detection means for detecting processing demands each time a base signal is generated by said signal generation means, each processing demand identifying one task of said set of tasks which needs to be executed;
   memory means for storing in predetermined storage locations a plurality of task processing programs, each of said task processing programs being associated with a respective one task of said set of tasks;
   selection means for selecting a single processing demand to be executed from among all of the task processing demands detected by said detection means and which has not been previously processed;
   address designation means for designating the task processing program stored in said memory means which is associated with said single processing demand selected by said selection means;
   task execution means for executing the task processing program designated by said address designation means; and
   idling mode control means for disabling said detection means, selection means, address designation means and task execution means in response to the completion of the execution of a task processing program by said task execution means and in response to the failure of said selection means to select a single processing demand.

4. A task processing control device for use in a public telephone set according to claim 3, further comprising:
   a rechargeable power source for supplying electrical power to said signal generation means, said detection means, said memory means, said selection means, said address designation means, said task execution means and said idling mode control means; and
   charge means for recharging said rechargeable power source when said idling mode control means disables said detection means, said selection means, said address designation means and said task execution means.

5. A task processing control device according to claim 4, wherein said charge means charges said rechargeable power source with the power supplied from the telephone office through the loop line of the telephone office.

6. A task processing control device according to claim 3, wherein each task of said set of tasks has a predetermined order of execution priority and said selection means selects tasks to be executed in said predetermined order of execution priority.

7. A task processing control device according to claim 6, wherein the predetermined order of execution priority is divided into a plurality of groups in accordance with the contents of the tasks which include a first priority group of tasks to be executed in a first predetermined processing cycle and a second priority group of tasks to be executed in a second predetermined processing cycle which is an integer multiple of said first predetermined processing cycle.

8. A task processing control device according to claim 7, wherein said selection means selects a processing demand of said second priority group when a task of said first priority group is not processed at a cycle which is said integer multiple of said first predetermined processing cycle.

9. A task processing control device according to claim 7, wherein the tasks of the respective first and second priority groups are further given priorities within the respective groups.

10. A task processing control device according to claim 1, comprising:
   a first timer which starts in response to a signal generated by said task execution means and generates a first time over output signal at a cycle rate which is an integer multiple of said base signals;
   second memory means for storing a plurality of start addresses and timer task programs to which access is made by said start addresses; and
   wherein said task execution means generates a timer processing demand in response to said first time over signal, each of said timer processing demands being associated with a respective one of said timer task programs, wherein said address designation means reads out of said second memory means a start address corresponding to the timer task program associated with the timer processing demand generated by said task execution means, and further wherein said task execution means executes said timer task program identified by said start address.

11. A task processing control device according to claim 10, further comprising a second timer which starts in response to a signal generated by said task execution means and generates a second time over output signal at a cycle rate which is an integer multiple of the operational cycle of said first time over output signal.

12. A task processing control device according to claim 1, wherein said memory means comprises:
   a program memory for storing said task processing programs;
   an address memory for storing start addresses of said task processing programs stored in said program memory; and
   wherein said address designation means reads out of said address memory a task start address associated with said single processing demand selected by said selection means, and said task execution means executes the task processing program stored in said program memory identified by said address read.

13. A task processing control device according to claim 12, wherein said address memory includes an area for writing in data as to the existence or nonexistence of an output from said detection means and said address designation means reads out the start address of said single processing demand based on such data.

14. A task processing control device according to claim 1, wherein said generation means, detection means, selection means, address designation means, task execution means and idling mode control means are comprised by a central processing unit and a read only memory having stored programs for controlling the operations of said central processing unit.

15. A task processing control device according to claim 14, wherein said detection means, selection means, address designation means and task execution means, which are disabled when the execution of a task processing program is completed or there is no task processing demand selected by said selection means, are constituted by said read only memory, and said idling mode control means disables said read only memory.

16. A method for controlling task processes comprising the steps of:
   dividing a plurality of single task operations into a plurality of groups in accordance with the priorities thereof and giving the single task operations priorities within each of said groups;
   repetitively generating process cycle periods;
   detecting execution demands corresponding to the respective single task operations during each process cycle period;
   selecting from the highest priority task operation group the highest priority task operation from that group whose execution demand is detected;
   executing said selected task operation within said process cycle period;
   selecting from a lower priority task operation group the highest priority task operation of that group whose execution is detected; and
   executing the task operation selected of said lower priority group within a cycle period which is an integer multiple of said process cycle period when there is no processing demand for a task operation in said higher priority group.

17. A method for controlling a task process of equipment so as to perform a plurality of single operations in accordance with a given priority order, comprising the steps of:
   generating repetitive process cycles having a predetermined period;
   detecting an operation request for a single operation during every process cycle;
   dividing said plurality of single operations into a plurality of groups consisting of a highest priority group and second and subsequent priority groups;
   establishing a priority order for each of said single operations in each of said groups;
   receiving data signals for each single operation;
   storing, during each process cycle, the data signals of the highest priority group and the data signals of the second and subsequent priority groups when an operation request for the data signals of the highest priority groups is absent; and
   controlling the processing of the equipment in accordance with the stored data signals.

18. A method for controlling the task process of equipment having a processing control circuit for performing predetermined processing in response to a plurality of task requests, wherein said processing control circuit generates repetitive processing cycles, checks the task requests during each processing cycle, performs a single task in accordance with a predetermined priority order during said processing cycle when a task request is present and said processing control circuit is set in standby state after said single task is completed, and is immediately set in said standby state when a task request is not present, and is released from said standby state by the next processing cycle.

19. A method for controlling task process of equipment comprising the steps of:

repetitively generating cycle signals having a period longer than the period of time for processing a single task;

individually and instantly detecting generated task processing demands during each cycle signal;

selecting a single task processing demand to be executed next from among all of said detected task processing demands and those task processing demands previously detected and remaining without having been processed;

designating an address in a memory having stored task processing programs, each stored task processing program associated with a respective one of all predictable task processing demands in response to said selection of a single task processing demand;

executing the task processing program of the designated address; and terminating said steps of selecting a single task processing demand, designating an address, executing the task when said step of executing the task is completed and when said step of selecting has no task processing demand to be executed.

* * * * *

UNITED STATES PATENT AND TRADEMARK OFFICE
CERTIFICATE OF CORRECTION

PATENT NO. : 4,612,418
DATED : September 16, 1986
INVENTOR(S) : Takeda, et al

Sheet 1 of 2

It is certified that error appears in the above-identified patent and that said Letters Patent is hereby corrected as shown below:

Column 1, line 15, delete "processing".

Column 2, line 6, delete a comma ---- , ----.

Column 5, line 28, delete "fine,".

Column 8, line 40, delete "that of".

Column 8, line 61, delete "cycle" and insert ---- cycles ----.

Column 16, line 68, delete "accorance" and insert ---- accordance ----.

Column 17, line 2, delete "S" and insert ---- so ----.

UNITED STATES PATENT AND TRADEMARK OFFICE
CERTIFICATE OF CORRECTION

PATENT NO. : 4,612,418

DATED : September 16, 1986

INVENTOR(S) : Takeda, et al

It is certified that error appears in the above-identified patent and that said Letters Patent is hereby corrected as shown below:

In the Claims

Column 18, line 11, delete "telphone" and insert ---- telephone ----.

Column 20, line 67, before "standby" insert ---- a ----.

Signed and Sealed this

Seventh Day of April, 1987

Attest:

DONALD J. QUIGG

Attesting Officer

Commissioner of Patents and Trademarks